US012487477B2

(12) United States Patent
Chabanov et al.

(10) Patent No.: US 12,487,477 B2
(45) Date of Patent: Dec. 2, 2025

(54) MAGNETIZATION-FREE FARADAY ROTATORS

(71) Applicant: Board of Regents, The University of Texas System, Austin, TX (US)

(72) Inventors: Andrey Chabanov, Austin, TX (US); Carl Pfeiffer, Austin, TX (US); Igor Anisimov, Austin, TX (US); Ilya Vitebskiy, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 560 days.

(21) Appl. No.: 17/971,949

(22) Filed: Oct. 24, 2022

(65) Prior Publication Data

US 2023/0131058 A1  Apr. 27, 2023

Related U.S. Application Data

(60) Provisional application No. 63/262,896, filed on Oct. 22, 2021.

(51) Int. Cl.
*G02F 1/09* (2006.01)
(52) U.S. Cl.
CPC .................................... *G02F 1/093* (2013.01)

(58) Field of Classification Search
CPC ..................................................... G02F 1/093
See application file for complete search history.

(56) References Cited

U.S. PATENT DOCUMENTS

| 2012/0001625 A1* | 1/2012 | Yamada | G02F 1/0036 324/244.1 |
| 2012/0052286 A1* | 3/2012 | Norwood | B82Y 25/00 428/323 |
| 2017/0176548 A1* | 6/2017 | Wu | G01R 33/032 |

FOREIGN PATENT DOCUMENTS

WO  WO-2020084157 A1 *  4/2020  ............. C23C 14/08

* cited by examiner

*Primary Examiner* — Edmond C Lau
(74) *Attorney, Agent, or Firm* — Thomas | Horstmeyer, LLP

(57) ABSTRACT

The present disclosure relates to magnetization-free Faraday rotator systems, apparatuses, and related methods. One such system comprises a Faraday rotator device comprising a magneto-optical composite material having first and second magnetic component materials in a periodic or uniform pattern in an X-Y plane, wherein the first and second magnetic component materials are magnetized along a Z-axis in opposite directions and the Faraday rotator device produces nonzero magnetic Faraday rotation for the electromagnetic wave propagating in a Z-axis direction in the absence of an external bias magnetic field.

21 Claims, 4 Drawing Sheets

MAGNETIZATION-FREE FARADAY ROTATORS

CROSS-REFERENCE TO RELATED APPLICATION

This application claims priority to the U.S. provisional application entitled, "Magnetization-Free Faraday Rotators," having Ser. No. 63/262,896, filed Oct. 22, 2021, which is entirely incorporated herein by reference.

STATEMENT REGARDING FEDERALLY SPONSORED RESEARCH OR DEVELOPMENT

This invention was made with Government support under grant contract number FA9550-19-1-0359 awarded by the Air Force Office of Scientific Research.

BACKGROUND

The key component of most nonreciprocal devices, such as microwave and optical isolators, circulators, and nonreciprocal phase shifters, is a magneto-optical material placed in an external magnetic field (Refs. 1-9). This traditional approach involves the use of bulky magnets, which can be a major problem, especially in small devices. Alternatively, one can use permanently magnetized materials, such as ferrites or ferromagnets with high coercivity. Such materials display nonreciprocal electromagnetic properties even in the absence of an external bias magnetic field. The magnetized material, though, creates its own demagnetization field, which depends on its shape.

One common problem with both externally biased and self-biased approaches is related to the existence of a relatively strong magnetic field outside the magneto-optical component. There are some important applications/devices which cannot tolerate even a tiny magnetic field, but they still require nonreciprocal components for optical isolation or other nonreciprocal functionalities. In addition, the demagnetization field inside the magnetized material is shape-dependent and can be non-uniform, unless the shape of the magnetized component is strictly ellipsoidal. The field non-uniformity inside magneto-optical material can seriously compromise the performance of the isolator, or any other nonreciprocal device.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure describes various embodiments of magnetization-free Faraday rotator systems, apparatuses, and related methods. Accordingly, the present disclosure relates to Faraday rotators used in microwave and optical isolators, circulators, and nonreciprocal phase shifters in a variety of applications, such as but not limited to light and microwave generation and amplification, communications, RADAR and LIDAR technologies.

Figure 1:
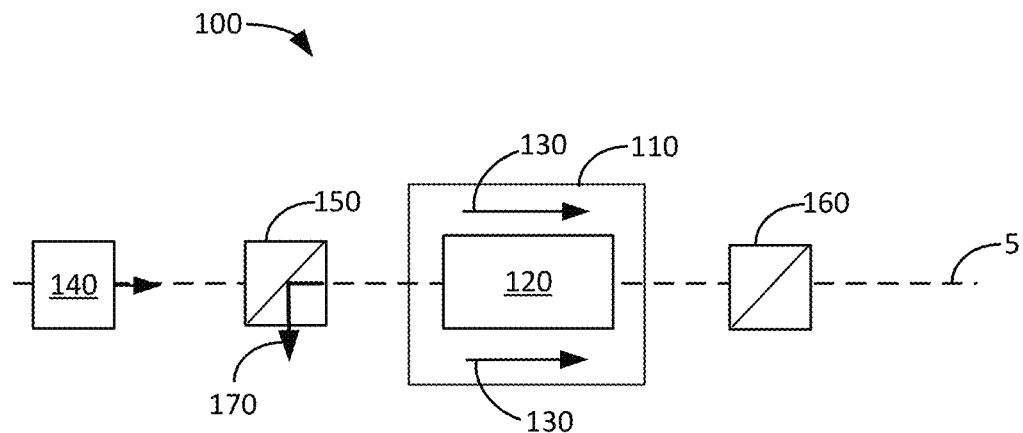
FIG. 1 shows a block diagram of a conventional optical or microwave isolator system.
Figure 5:
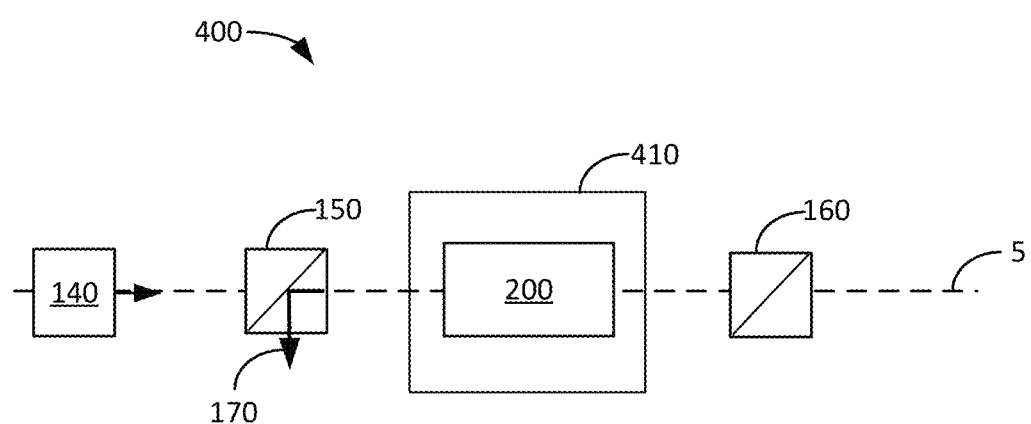
FIG. 5 shows a block diagram of an isolator system in accordance with embodiments of the present disclosure.

An optical isolator is routinely used to decouple a laser oscillator or an optical/microwave amplifier from unwanted feedback, such as downstream laser amplifier noise radiation and/or target reflections. Referring to FIG. 1, a conventional isolator system 100 uses non-reciprocal magneto-optic polarization rotation in a Faraday rotator 110 comprised of a magneto-optical device 120 in a strong external magnetic field 130 co-axial with the laser radiation along the axis 5 from a laser source 140 to rotate the plane of polarization 45 degrees. Polarizers 150, 160 are aligned at an input and output of the Faraday rotator 110 as part of the optical isolator system 100. Because Faraday effect rotation is non-reciprocal, any backward propagating radiation will have the plane of linear polarization rotated a further 45 degrees resulting in a polarization state which is 90 degrees to the transmission axis of the input polarizer 150 and will consequently experience high backward transmission loss as a rejected beam 170. A similar description applies to microwave isolators.

This conventional approach involves the use of bulky magnets, which can be a major problem, especially in small devices. Alternatively, one can use permanently magnetized materials, such as ferrites or ferromagnets with high coercivity. Such materials display nonreciprocal electromagnetic properties even without an external bias magnetic field. The magnetized material, though, creates its own demagnetization field, which can create the problems outlined below.

One common problem with both externally biased magnetic fields and self-biased magnetic fields is related to the existence of a relatively strong magnetic field outside the magneto-optical component, while there are specific applications that do not tolerate even a tiny magnetic field. In addition, the demagnetization field inside the magnetized material is shape-dependent and can be non-uniform unless the shape of the magnetized component is strictly ellipsoidal. The latter can seriously compromise the performance of the isolator or any other nonreciprocal device.

A known solution to the above problems is provided by compensated ferrites, which have zero net magnetization, while producing a significant magnetic Faraday rotation even in the absence of an external bias magnetic field. Such single-phased materials usually comprise two magnetic subsystems (magnetic sublattices) involving different kinds of magnetic ions. The first magnetic subsystem comprises magnetic ions of the iron group (3d-ions). At room temperatures, the respective magnetic sublattices are saturated and have nonzero combined magnetization. The second magnetic subsystem includes rare earth ions (4f-ions) with the combined magnetization equal and opposite to that of the first magnetic subsystem. Despite zero net magnetization, such compensated ferrites can produce sufficiently strong magnetic Faraday rotation and, hence, can be used in nonreciprocal applications. Examples of the kind are provided by some rare earth orthoferrites and garnets (for instance, Ce-doped garnet $Tb_3Fe_5O_{12}$). An inherent problem with the compensated ferrites is that the first (3d) magnetic subsystem is fully saturated at room temperatures, while the rare earth magnetic sublattices are far from saturation. For this reason, the combined magnetization of the first magnetic subsystem is fixed, while the contribution of the rare earth magnetic sublattices to the net magnetization is temperature-dependent. Consequently, the state with zero net magnetization can only be realized at a certain temperature. Above and below the compensation temperature, the net magnetization of the ferrite reappears. Another inherent problem with all rare earth ferrites is that not only their magnetization but also their Faraday rotation is highly dependent on temperature. Finally, due to the reappearing net magnetization, the ferrite might develop a domain structure, which can sharply increase absorption while reducing or eliminating the Faraday rotation.

The present disclosure presents a qualitatively different approach to achieving a strong Faraday rotation without a bias field in a material with zero net magnetization to address the above problems. Such an approach is based on composite structures involving two different magnetic materials satisfying the following two conditions. Firstly, the total magnetization of a first magnetic component is equal and opposite to the total magnetization of the second magnetic component, which results in zero net magnetization of the composite structure. Secondly, the Curie temperatures of both magnetic component materials must be high enough to be magnetically saturated at operational temperatures (e.g., room temperature). The latter condition ensures that zero net magnetization of the composite is maintained within a broad temperature range, while the Faraday rotation per unit length also remains temperature-independent. In one preferred embodiment, one of the constitutive materials is magnetically hard and strongly anisotropic (e.g., Nd), while the other is magnetically soft and displays low losses at operational frequencies (e.g., YIG at microwave frequencies). Under this constrain, only one of the two constitutive materials efficiently interacts with the electromagnetic oscillations and thereby contributes to the nonreciprocal Faraday rotation, while the other magnetic component provides the magnetic bias for the first one, as well as cancels out the net magnetization of the composite structure. In yet another embodiment, the second magnetic component can be a periodic or uniform array of metal rods (e.g., Nd permanent magnet rods), in which case the electromagnetic field will not penetrate inside the second magnetic material. The latter can enhance Faraday rotation and/or reduce losses.

Figure 2:
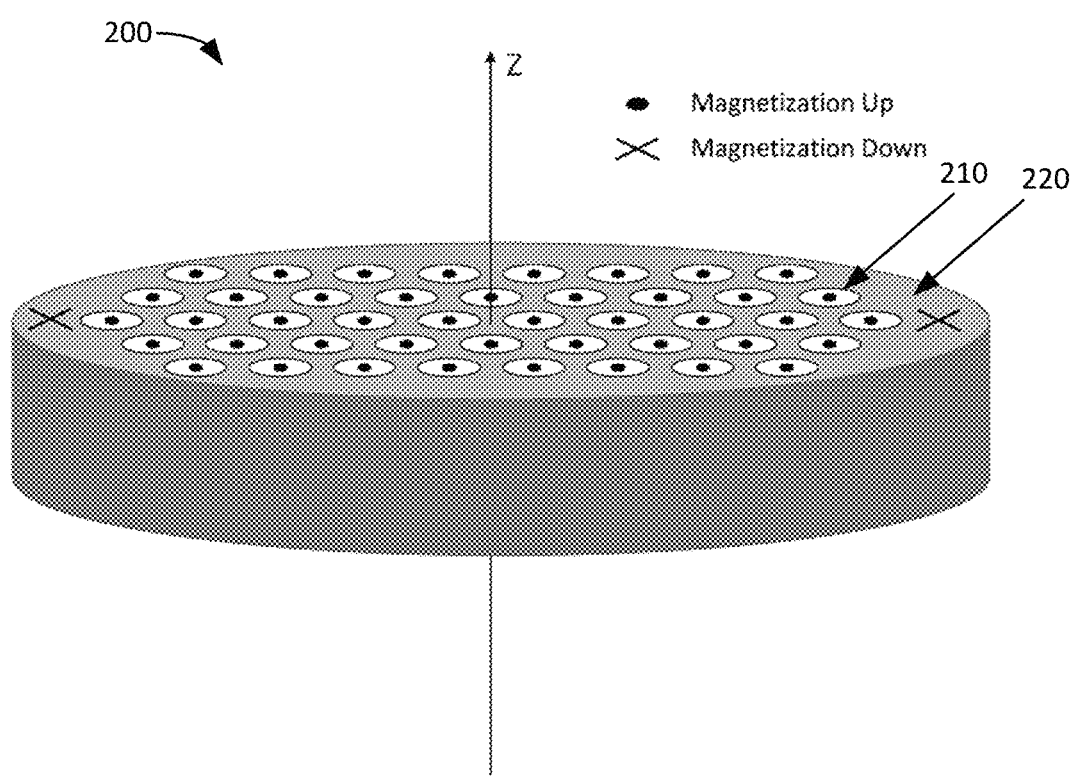
FIG. 2 shows an exemplary magneto-optical composite material with zero net magnetization composed of a slab of two magnetized components in accordance with embodiments of the present disclosure.
Figure 3A:
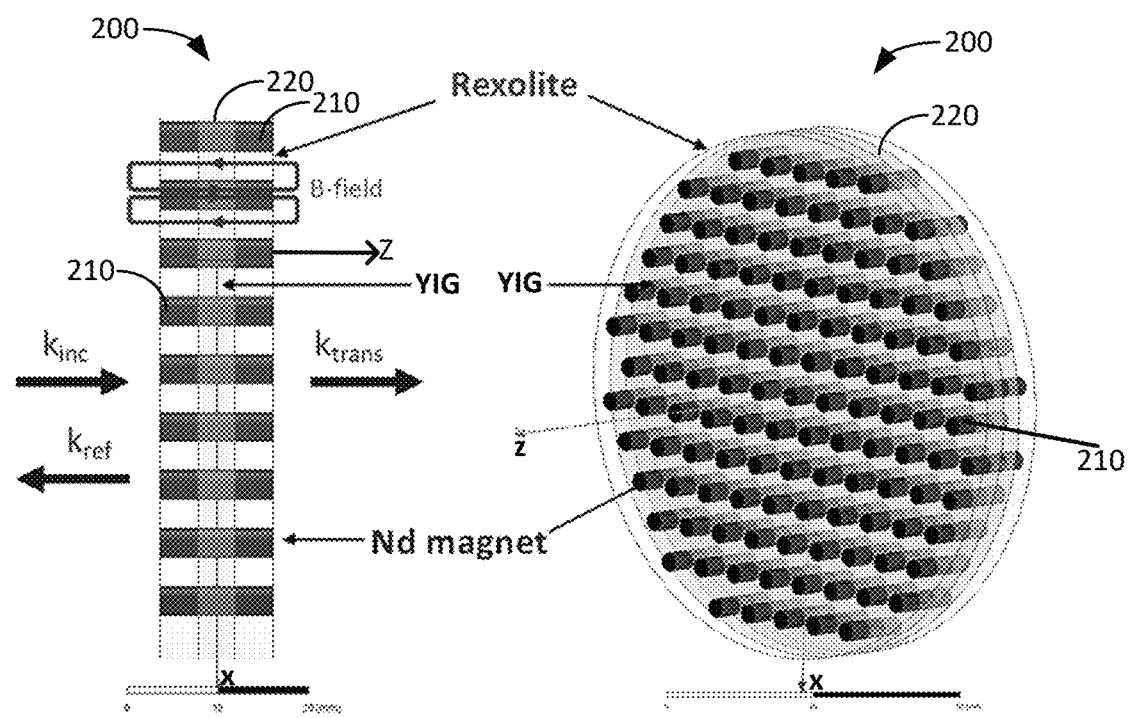
FIG. 3A shows a side view and a perspective view of an exemplary magneto-optical composite material with zero net magnetization in accordance with embodiments of the present disclosure.
Figure 3B:
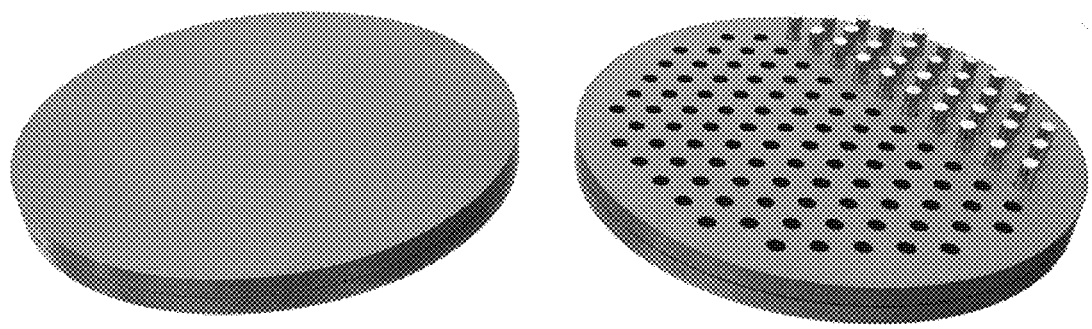
FIG. 3B shows an image of top and bottom views of a fabricated sample of an exemplary magneto-optical composite material with zero net magnetization, similar to the drawing of FIG. 3A.
Figure 4A:
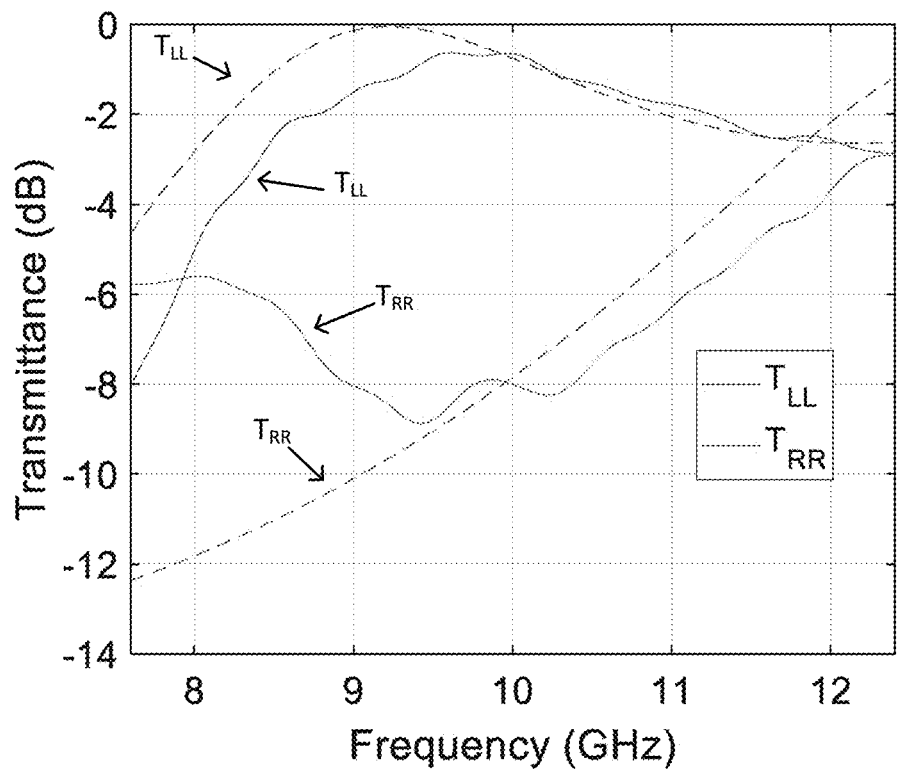
FIGS. 4A-4B show microwave measurements and simulation results for Faraday rotation of the magneto-optical composite material of FIG. 3A.
Figure 4B:
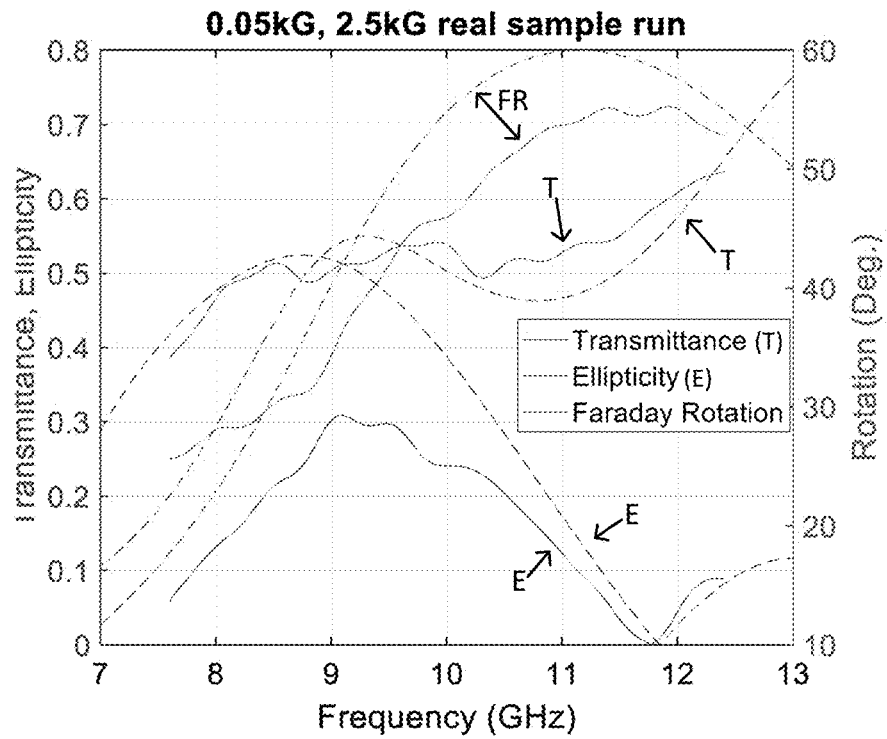

Possible realizations of the nonreciprocal composite structures with zero net magnetizations are shown in FIGS. 2 and 3A-3B, along with the simulation results and experimental data for Faraday rotation shown in FIGS. 4A-4B. These structures are designed for microwave frequencies, but the same idea can also be readily extended to optical wavelengths.

Referring now to FIG. 2, an exemplary magneto-optical composite material 200 composed of a slab of two magnetized component materials arranged periodically in the X-Y plane is illustrated. In this example, the second magnetic component material 210 is a periodic array of rods embedded in the matrix representing the first magnetic component material 220. Alternatively, it can be a periodic or uniform array or pattern of two different magnetic component materials embedded in a nonmagnetic matrix. In various embodiments, the periodic array comprises an alternating pattern of magnetic component materials.

The two magnetic component materials 210, 22 are magnetized along the Z-axis in opposite directions (e.g., each of the two magnetic component materials is magnetized in the opposite direction along the Z-axis, normal to the slab). In this arrangement, the device 200 produces magnetic Faraday rotation for the electromagnetic wave propagating in the Z-direction, even without a bias magnetic field. Correspondingly, the net magnetization of each unit cell of the periodic array is zero while still producing the magnetic Faraday rotation, given that zero net magnetization implies a negligible demagnetization field outside the slab. In accordance with embodiments of the present disclosure, one of the two magnetic component materials is a magnetically soft material (e.g., the first magnetic component material 220) with the magnetization direction induced by the other magnetic component material (e.g., the second magnetic component material 210). For example, the second magnetic component material 210 can be a magnetically hard material. Alternatively, one of the two magnetic component materials may be dielectric, while the other is either a metal or coated with metal. In this case, the electromagnetic field can only penetrate inside the first (dielectric) magnetic component material, which will be solely responsible for the magnetic Faraday rotation. The role of the second (metallic) magnetic component material reduces to the creation of a bias magnetic field on the first (dielectric) magnetic component material. As such, the net magnetization of each unit cell of the periodic array is zero, while it still produces the magnetic Faraday rotation for the electromagnetic wave propagating in the Z-direction. Correspondingly, in various embodiments, both magnetic component materials 210, 220 have much higher Curie temperatures compared to the operational temperature, in which case, each magnetic component material will be magnetically saturated. In this case, the magnetization of each component material, the net magnetization of a unit cell, and the Faraday rotation produced by the device 200 will be temperature-independent. Accordingly, the device 200 of FIG. 2 can produce magnetic Faraday rotation and/or nonreciprocal phase shift at microwave and/or optical frequencies.

Referring now to FIG. 3A, a side view of an exemplary magneto-optical composite material 200 with zero net magnetization is provided next to a perspective view. In the side view (on the left of the figure), the first magnet component material 220 comprises a disk of yttrium iron garnet (YIG) material, where the first magnet component material 220 incorporates a periodic array of second magnetic component material 210 comprising Nd magnets embedded in the YIG material. Additionally, in various embodiments, an anti-reflection coating (e.g., Rexolite layer(s)) can be applied over the second magnet component, as shown in the figure, to minimize reflection losses on the surface of the magneto-optical device. The two magnetic components are magnetized along the Z-axis in opposite directions (e.g., each of the two magnetic component materials is magnetized in the opposite direction along the Z-axis, normal to the slab). Correspondingly, FIG. 3B shows an image of top and bottom views of a fabricated sample of the magneto-optical composite material with zero net magnetization, similar to the drawing of FIG. 3A.

In FIGS. 4A-4B, microwave measurements are displayed for simulation results and experimental data for Faraday rotation of the magneto-optical composite material of FIG. 3A. In FIG. 4A, microwave measurements are shown as solid lines, and numerical simulations are shown as dashed lines of the magneto-optical composite material of FIG. 3A with the transmittance of the right-circular waves and left-circular waves presented. Correspondingly, in FIG. 4B, total transmittance, ellipticity, and Faraday rotation characteristics are illustrated for the magneto-optical composite material of FIG. 3A.

Referring to FIG. 4, an exemplary isolator system 400, in accordance with embodiments of the present disclosure, uses non-reciprocal magneto-optic polarization rotation in a Faraday rotator device 400 comprised of a magneto-optical composite material 200 with zero net magnetization with laser radiation along the axis 5 from a laser source 140 to rotate the plane of polarization, such as, but not limited to, 45 degrees. Polarizers 150, 160 are aligned at the input and output ports of the Faraday rotator 410 as part of the optical isolator system 100. Because Faraday effect rotation is non-reciprocal, any backward propagating radiation will have the plane of linear polarization rotated a further 45 degrees (or another set amount), resulting in a polarization state which is 90 degrees, in this non-limiting example, to the transmission axis of the input polarizer and will consequently experience high backward transmission loss as a rejected beam 170. In certain embodiments, the Faraday rotator device 400 and the polarizers 150,160 are separate elements. In alternative embodiments, the Faraday router device 400 and the polarizers 150, 160 form a single element.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

REFERENCE LIST

References are cited herein throughout using the format of reference number(s) enclosed by parentheses corresponding to one or more of the following numbered references. For example, citation of references numbers 1 and 2 immediately herein below would be indicated in the disclosure as (Refs. 1 and 2), or citation of reference numbers 1 to 5 immediately herein below would be indicated in the disclosure as (Refs. 1-5).

Ref 1. U.S. Pat. No. 7,961,391, tilted "Free Space Isolator Optical Element Fixture," filed on Mar. 13, 2008 and issued on Jun. 14, 2011.

Ref 2. U.S. Pat. No. 6,977,763, titled "Free-Space Optical Isolator with Integrated Quarter-Wave Plate, filed on Nov. 5, 2003 and issued on Dec. 20, 2005.

Ref 3. U.S. Pat. No. 5,757,538, titled "Optical Isolator," filed on Feb. 16, 1994 and issued on May 26, 1998.

Ref 4. U.S. Pat. No. 11,050,209, titled "Apparatus and Method for Optical Isolation," filed on Jan. 26, 2018 and issued on Jun. 29, 2021.

Ref 5. U.S. Pat. No. 6,580,546, titled "Faraday Rotator," filed on Aug. 3, 2001 and issued on Jun. 17, 2003.

Ref 6. U.S. Pat. No. 5,528,415, titled "Compact Enhanced Performance Optical Isolator Using a Faraday Rotator," filed on Nov. 9, 1994 and issued on Jun. 18, 1996.

Ref 7. U.S. Pat. No. 10,942,381, titled "Faraday Rotators of Terbium Oxyhydroxide," filed on Jul. 13, 2018 and issued on Mar. 9, 2021.

Ref 8. U.S. Pat. No. 4,856,878, titled "Magnetic Configuration for Faraday Rotators," filed on Dec. 4, 1987 and issued on Aug. 15, 1989.

Ref 9. U.S. Pat. No. 4,804,256, tilted "Faraday Rotators Using a Movable Optical Element, filed on Mar. 31, 2017 and issued on Aug. 9, 2022.

Therefore, at least the following is claimed:

1. A system comprising:
    a Faraday rotator device comprising a magneto-optical composite material having first and second magnetic component materials in a periodic or uniform pattern in an X-Y plane,
    wherein the first and second magnetic component materials are magnetized along a Z-axis in opposite directions,
    wherein the Faraday rotator device produces nonzero magnetic Faraday rotation for an electromagnetic wave propagating in a Z-axis direction in the absence of an external bias magnetic field.

2. The device of claim 1, in which a net magnetization of each unit cell of the periodic pattern is zero, while the net magnetization produces the nonzero magnetic Faraday rotation.

3. The system of claim 1, wherein the first magnetic component material is a magnetically soft material with a magnetization direction induced by the second magnetic component material.

4. The system of claim 1, wherein the second magnetic component material is a magnetically hard magnetic material.

5. The system of claim 1, wherein Curie temperatures of the first and second magnetic component materials are magnetically saturated at an operational temperature.

6. The system of claim 1, wherein the Faraday rotation device produces magnetic Faraday rotation at microwave or optical frequencies.

7. The system of claim 1, wherein the second magnetic component material is a periodic or uniform array of rods embedded in a matrix of the first magnetic component material.

8. The system of claim 1, wherein the periodic or uniform pattern comprises arrays of the first and second magnetic component materials embedded in a nonmagnetic matrix material.

9. The system of claim 1, wherein a magnetic Faraday rotation produced by the Faraday rotator device is temperature independent.

10. The system of claim 1, wherein a magnetic Faraday rotation produced by the Faraday rotator device is temperature independent, while a net magnetization of the system is zero within the same temperature range.

11. The system of claim 1, wherein the first magnetic component material comprises a dielectric magnetic material and the second magnetic component material comprises a metallic or a metal-coated magnetic material.

12. The system of claim 1, further comprising first and second polarizers, wherein the Faraday rotator device is positioned between the first and second polarizers.

13. The system of claim 12, wherein the first and second polarizers and the Faraday rotator device comprise a single element.

14. A method comprising:
forming a magneto-optical composite material having two different magnetic component materials in a periodic or uniform pattern in an X-Y plane,
wherein a first one and a second one of the two different magnetic component materials are magnetized along a Z-axis in opposite directions.

15. The method of claim 14, wherein Curie temperatures of the first and second magnetic component materials are magnetically saturated at room temperature.

16. The method of claim 14, wherein the first magnetic component material comprises Neodymium (Nd) and the second magnetic component material comprises yttrium iron garnet (YIG).

17. The method of claim 14, wherein the second magnetic component material is a periodic or uniform array of rods embedded in a matrix of the first magnetic component material.

18. The method of claim 14, wherein the periodic or uniform pattern comprises arrays of the first and second magnetic component materials embedded in a nonmagnetic matrix material.

19. The method of claim 14, wherein the magneto-optical composite material produces magnetic Faraday rotation for the electromagnetic wave propagating in the Z-axis direction without an external bias magnetic field.

20. The method of claim 14, wherein a magnetic Faraday rotation produced by the magneto-optical composite material is temperature independent.

21. The method of claim 14, wherein the first magnetic component material comprises a dielectric magnetic material and the second magnetic component material comprises a metallic or a metal-coated magnetic material.

* * * * *